(No Model.) 3 Sheets—Sheet 2.
D. H. WILSON.
ELECTRIC CATTLE GUARD.
No. 520,510. Patented May 29, 1894.
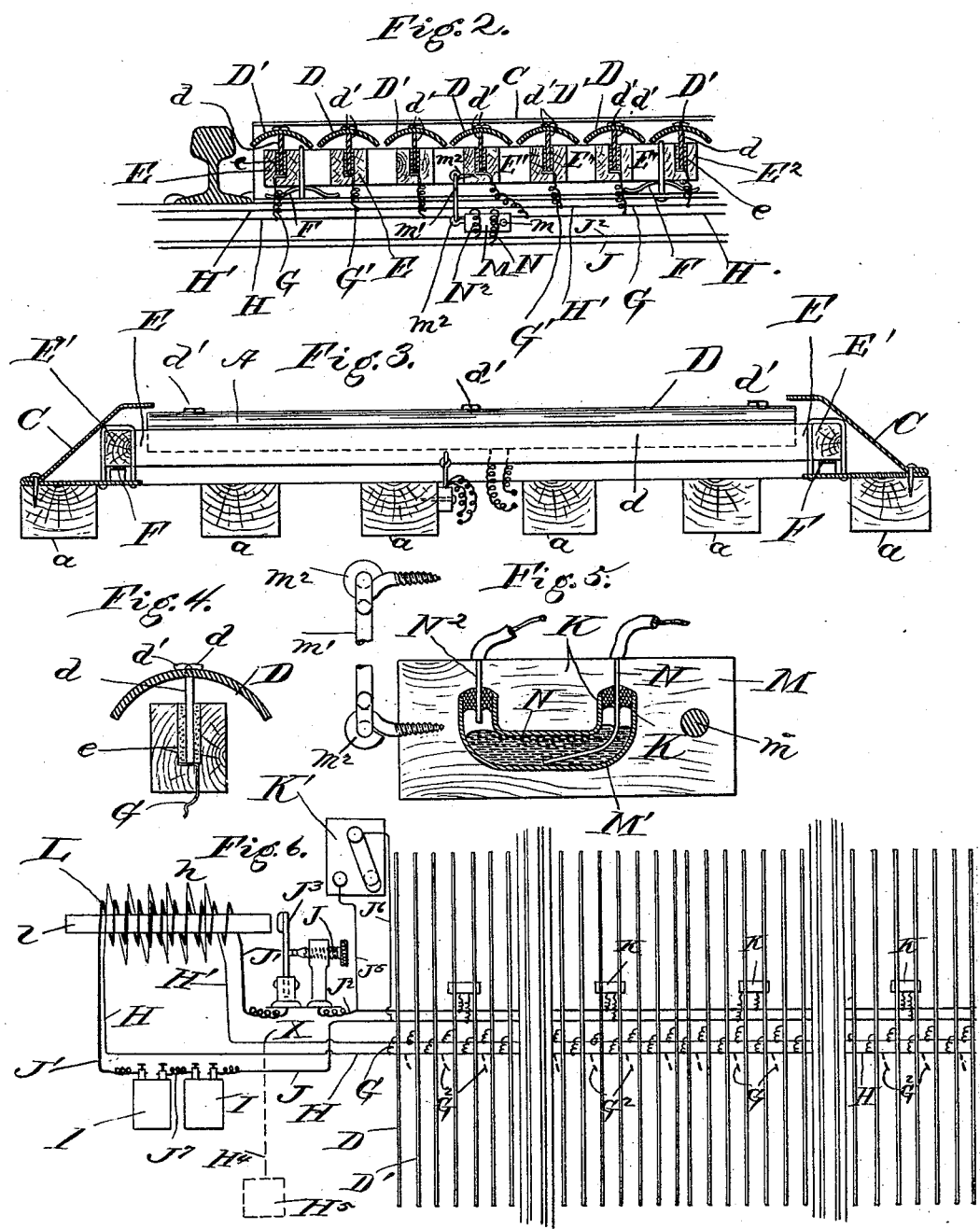

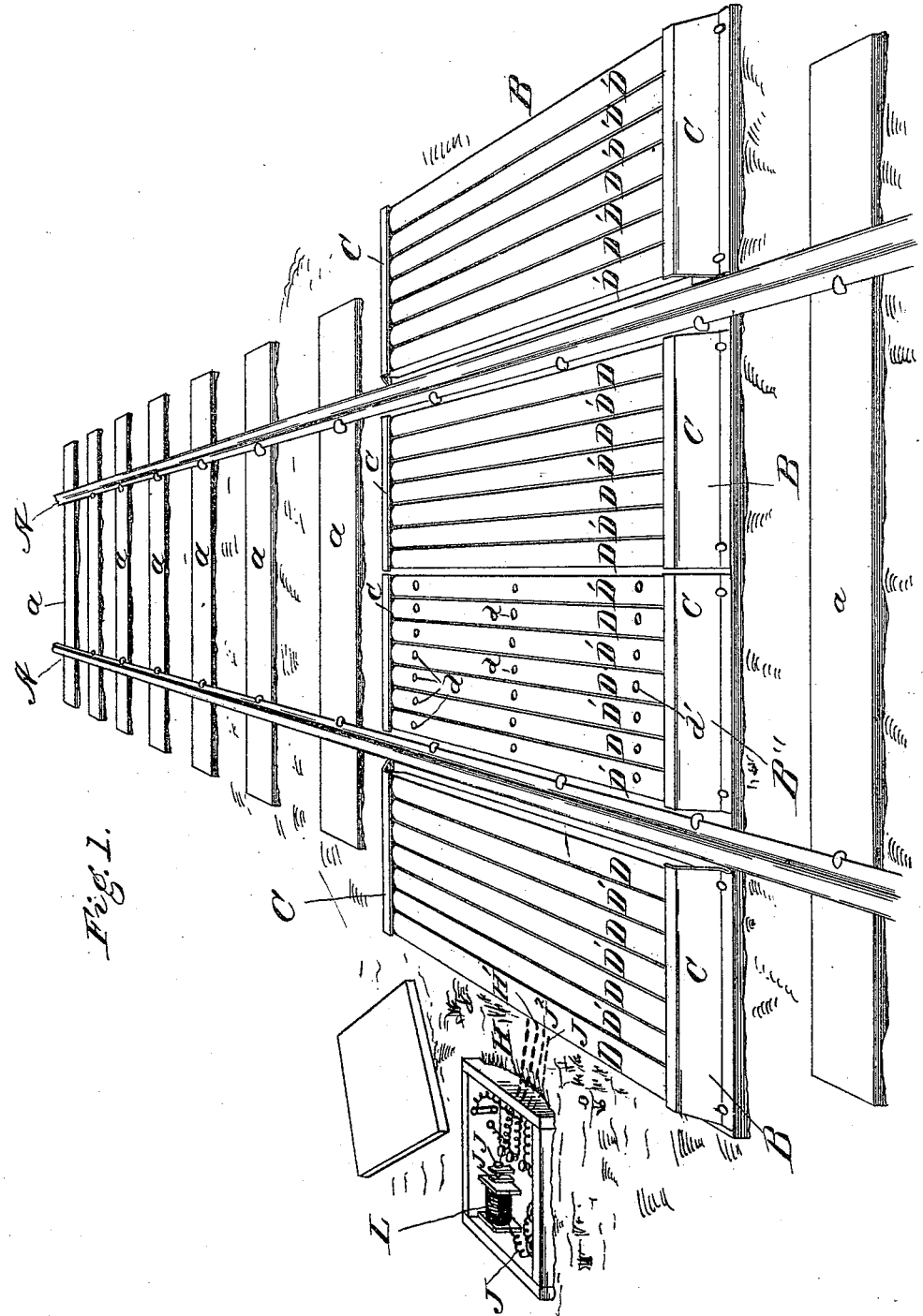

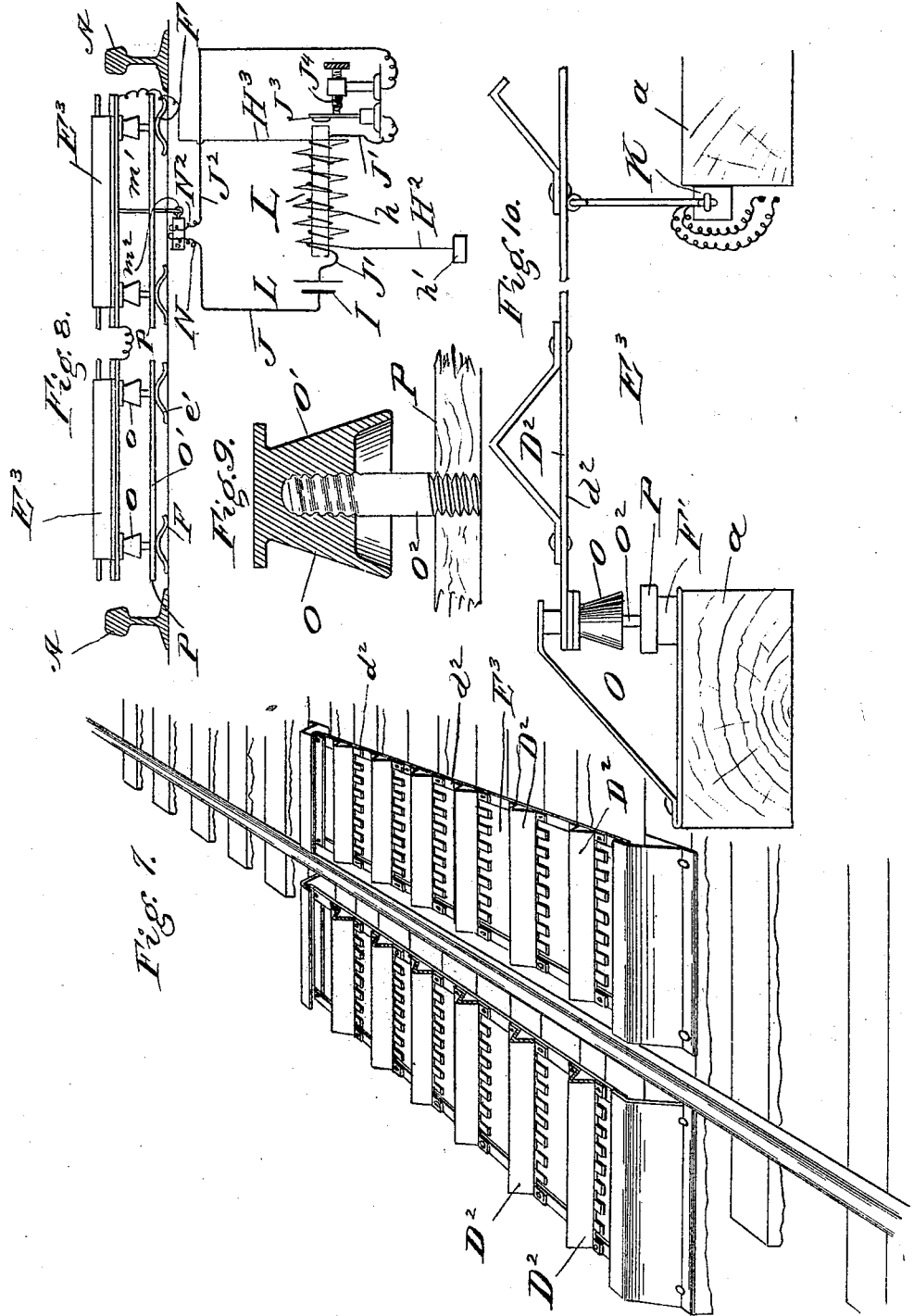

UNITED STATES PATENT OFFICE.

DAVID H. WILSON, OF CHICAGO, ILLINOIS.

ELECTRIC CATTLE-GUARD.

SPECIFICATION forming part of Letters Patent No. 520,510, dated May 29, 1894.

Application filed May 18, 1893. Renewed March 12, 1894. Serial No. 503,372. (No model.)

*To all whom it may concern:*

Be it known that I, DAVID H. WILSON, a resident of Chicago, in the county of Cook and State of Illinois, have invented a certain new and useful Electric Cattle-Guard, of which the following, when taken in connection with the drawings accompanying and forming a part hereof, is a full and complete description, sufficient to enable those skilled in the art to which it appertains to understand, make, and use the same.

My invention relates to cattle guards of the kind commonly known as "surface guards," designed to be used, principally, in connection with railroad tracks for the purpose of preventing cattle or other animals from straying upon the railroad right of way from streets, highways or other crossings extending over such railroad right of way and tracks.

The object of my invention is to obtain a surface cattle guard by the use whereof no injury will be inflicted on cattle or other domestic animals coming in contact therewith or attempting to pass thereover; and further, a cattle guard of the kind named which will effectually prevent the crossing thereover of cattle or other animals to and upon the right of way of the railroad. It is well known to those familiar with the art that injury and even maiming is at times produced upon cattle and other animals by cattle guards, including surface cattle guards, of the kind heretofore constructed. That when cattle or other animals are moving at or with considerable speed toward the cattle guard with the intention of crossing the same, the obstruction offered by such cattle guard is not of a nature effectually to prevent such or other animals from crossing over the same upon the right of way of the railroad; and it is in case of such crossing or attempted crossing that injury and maiming is ordinarily done.

I have found by many experiments that cattle or other animals, wild as well as domesticated, will, upon receiving a sufficiently severe shock from an electric current, be suddenly stopped and made to recoil and shrink back from further forward movement or progress at whatever rate of speed they may approach the object or thing by which the electric shock is produced, and that the intensity of the electric shock required to cause such recoil, or even to bring them to the ground, is not sufficient to produce injury to the animal. And I have therefore, in order to accomplish the several objects sought by me, embodied my inventions in electric cattle guards in the several constructions hereinafter described and illustrated in the drawings accompanying and forming a part hereof, in place of relying upon any of the heretofore employed means of startling, shocking or producing a feeling of pain or insecurity in such cattle or other domestic animals, as by the shape or configuration of or apparent instability in the constructions with which the cattle or other domestic animals come in contact in attempting to cross over or upon such cattle guards.

In the drawings referred to—Figure 1, is a front perspective view of a railroad track, a surface cattle guard embodying my invention extending over the track, with a well, (from which the cover is removed,) to one side of the railroad track and cattle guard, and certain elements entering into the construction of the cattle guard exposed to view in such well; Fig. 2, a transverse sectional view of one rail of a railroad track and of a portion of the constructions entering into the cattle guard embodying my invention; Fig. 3, a side elevation of the cattle guard illustrated in perspective in Fig. 1; Fig. 4, a transverse, sectional view, on an enlarged scale, of one of the elements entering into the cattle guard illustrated in Fig. 1; Fig. 5, a sectional view of certain constructions constituting elements in the cattle guard illustrated in perspective in Fig. 1 of the drawings, such constructions forming an automatic electric circuit closer adapted to be actuated by the weight, or a portion thereof, of any animal on the cattle guard; and Fig. 6, a diagram of the electric circuits and apparatus entering into the constructions constituting the cattle guard embodying my invention illustrated in Figs. 1 to 5, all inclusive. Fig. 7, is a perspective view of one rail of a railroad track and of a cattle guard embodying my invention by the side thereof, such cattle guard constituting a modification of the constructions illustrated in Figs. 1 to 6, both inclusive; Fig. 8, a transverse sectional view of a railroad track and of the cattle guard illustrated in Fig. 7, extending between the rails of the track, with a diagrammatic view of the electric circuits and other apparatus entering thereinto; Fig. 9, a vertical sectional view of an inverted cup forming in combination with the parts thereof shown in elevation therewith, an insulator constituting an element entering into the construction of a cattle guard embodying my invention, and Fig. 10, an end elevation, on an enlarged scale, of the constructions illustrated in Figs. 7 and 8.

I have employed the same letter of reference to indicate a given part where more than one view thereof is shown in the several figures of the drawings.

A A are the rails of a railroad track; and $a\,a\,a$, the ties or sleepers thereof.

B B B is a surface cattle guard embodying my invention.

C C are, respectively, the end guards or plates of the cattle guard.

D D' are, respectively, metal plates. The several metal plates D D D are of the same electric polarity and of opposite electric polarity to the metal plates D' D', and the several metal plates D' D' are of the same electric polarity.

$d, d, d$, are, metal plates extending in a vertical plane from the bars E, E, to bars D D', and holding the bars D D', rigidly in position relatively to such bars E E.

$d'\,d'$ are portions of metal plates, $d, d$, extending through plates D, D', and turned down over such plates, D D', as is well illustrated in Fig. 4 of the drawings.

E' E' are bars, extending across the ends of bars E E, and to which such bars E E are secured. Bars E' E' constitute the end bars of the frame hereinafter termed $E^2$ and consisting of bars E E and E' E', metal plates $d\,d$ and D D'.

The respective bars E E' are constructed of non-conducting material, say wood, and $e\,e$ is non-conducting material as say, asbestus, mineral wool, powdered glass or other like material serving as packing to the part of plates $d\,d$, embedded in bars E E.

F F are springs on which frame $E^2$ is yieldingly mounted.

G G' are electric conductors as, say, metal wire, which are, electrically connected at one end with plates $d\,d$, and at the other end extend to and are electrically connected with the wires H H', entering, together with the secondary coil $h$ of the induction coil L, into the secondary circuit constituting an element in the device embodying my invention.

I is a primary battery serving as an electrical generator when the circuit thereof is closed.

J J' $J^2$ are wires forming, in combination with vibrating circuit closer $J^3$; terminals $J^4$ and automatic circuit closer K; or if preferred, wires $J^5$, switch K' and wire $J^6$ are substituted for automatic circuit closer K; a primary circuit extending from the primary batteries I I, respectively, to and through induction coil L.

$l$ represents the magnetizable metal core of induction coil L, by means of which the vibratory spring circuit closer $J^3$ is drawn forward from terminal $J^4$ and its electric contact therewith broken, and thereby an intermittent primary current is obtained in the primary circuit forming part of my device.

When the switch K' is closed an intermittent primary current is continuously extending over the primary circuit consisting of generators I I; wires J $J^6$; switch K'; wires $J^5$ $J^2$; terminal $J^4$; vibrating circuit breaker $J^3$ and wire J' through induction coil L back to the electrical generators I I. When the switch K', however, is closed, thereby closing the primary circuit, a continuous current of electricity is generated in electrical generators I I, and intermittently transmitted over the primary circuit.

To avoid the continuous transmission of the primary current over the primary circuit of the device embodying my invention, I open the switch K', thereby opening the primary circuit, yieldingly mount frame $E^2$ as hereinbefore described and insert automatic circuit closer K as an element of the device, and I shall hereinafter confine the description of my electric cattle guard to the construction thereof wherein the switch is omitted or maintained in an open position. Where the switch K' forms no part of the primary circuit the closing of such circuit is obtained by means of the automatic circuit closer K suitably connected to the yielding frame $E^2$ to be actuated and closed thereby upon the weight or partial weight of an animal coming upon such frame.

Circuit closer K consists of bar M mounted on a fulcrum $m$ at one end thereof and secured by link $m'$ at the other end thereof to some one of the bars E entering into frame $E^2$ or to some one of the bars E' thereof.

M', is a hermetically sealed tube, having upturned ends and constructed of non-conducting material, (preferably glass;) N, a conducting wire extending into the tube M' and into electric communication with conducting fluid N' (preferably mercury or quicksilver, as it is termed); and $N^2$, a conducting wire extending into the tube M', but not a sufficient distance thereinto to come into electrical contact with fluid N' when the circuit closer is in substantially the position in which it is maintained on fulcrum $m$ by link $m'$ when no weight, (or not sufficient weight to depress the same,) is on the frame $E^2$. When sufficient weight is on the frame $E^2$, as by the weight or partial weight of an animal coming thereon, to depress such frame $E^2$ the end of the block M to which the link $m'$ is attached by means of bolts $m^2\,m^2$, respectively, is also thereby depressed and the fluid N' flows toward the end of the tube M' into which is inserted the wire $N^2$ and comes in electrical-contact therewith, and thereby establishes electrical connection between wire N and wire N². The primary circuit of my device which consists of batteries I I; wire J; wire N; fluid N'; wires N² and J²; terminal J⁴; vibrating circuit-breaker J³ and wire J', back to the batteries I I is thus completed. Where more than one battery is employed the wire J⁵ is extended from the positive pole of one battery to the negative pole of the adjacent battery in the ordinary manner. The vibrating circuit breaker J³ produces an intermittent opening and closing of the primary circuit and a consequent intermittent primary current.

The operation of the device may be stated briefly thus: When the circuit is closed by the depression of the frame E², upon an animal's stepping thereon, an intermittent electric current, generated in the primary batteries I I or other electric generators, will extend over the primary circuit, closed as last described by the movement of bar M; and such intermittent primary current extending over the circuit and through the induction coil L, a secondary current of required intensity and quantity is thereby induced in the secondary wire $h$, of the induction coil L. Such secondary current will extend from induction coil L through wires H H', to plates D D', and through the body, or a part thereof, of the animal depressing the frame E², which will form a part of the secondary circuit consisting of wires H, G; plate D, that part of the animal in contact with such plate; plate D'; wire G'; wire H' and wire $h$ in the induction coil L; and an electrical shock is thus given to the animal.

In the construction illustrated in Figs. 7, 8 and 10, the several plates D² D² are all either positively electrified, or negatively electrified, (as preferred,) and the return conductor of the secondary circuit, of which the animal whose weight is wholly or partially upon the cattle guard forms an element, consists of the earth and not of a return wire, as in the construction illustrated and described in Figs. 1 to 6, both inclusive.

In the constructions illustrated in Figs. 7 and 8, a frame, E³, mounted on springs F' in substantially the same way as the frame E² is mounted on springs F, is employed, in such manner that the weight of the animal on the frame E³ will close the primary circuit by means of the automatic circuit closer K in precisely the same way as hereinbefore described. Frame E³ consists of the plates D² D² mounted on bars $d^2$, such bars being supported on insulators O, and bars P, resting on springs F'. The insulator O consists of the inverted cup O' and the post O² secured at one end in the cup O' and adapted at the other end to be secured in the bar P. The post O² is constructed of non-conducting material so that the plates D² entering into and forming a part of the frame E³ will not be electrically connected with the ground. In order to make the ground or earth the return conductor of the secondary circuit it is of course necessary to ground one end of the wire $h$ of the induction coil L, and H² (Fig. 8) is a wire extending from the wire of coil $h$ to ground plate $h'$. H³ is a wire extending from the other end of the coil $h$ to the series of plates D² D². In this modification the primary circuit consists of primary batteries or generators I I; wire J; circuit closer K, (consisting of wire N; conducting fluid N', wire N² and bar M and connections;) wire J²; electrical terminal J⁴; vibrating circuit-breaker J³ and wire J' extending from vibrating circuit-breaker J³ through induction coil L to battery I.

The operation of the modification illustrated in Figs. 7, 8 and 10 of the drawings is, mechanically, precisely the same as is the operation of the constructions embodying my invention illustrated in Figs. 1 to 6, both inclusive, as heretofore described. When, however, in this modification, the primary circuit is closed by the weight or partial weight of an animal on frame E³, as hereinbefore described, the secondary current thereby induced in the coil $h$ of the induction coil L will extend from such coil on wire H³ to the plates D², from thence through the animal in contact with such plates, and forming a part of the secondary circuit, to the ground, by way of the ground to ground plate $h'$ or wire H² and from thence on wire H² back to coil $h$, thus completing the secondary circuit.

The several mechanical constructions of the cattle guard illustrated in Figs. 1 to 6, both inclusive, of the drawings and heretofore described are, or may be made, precisely the same as the mechanical constructions entering into the cattle guard embodying my invention and illustrated in Figs. 7, 8 and 10 of the drawings, and heretofore described; the only difference necessarily existing in the two constructions being the difference of arrangement of the electrical conductors entering into the secondary circuit of the device, although the frame E² as illustrated and described consists of a combined iron and wood construction, and frame E³ consists of an iron construction, (post $o^3$ alone being of non-conducting material, preferably wood). That is to say, in the ordinary terms of the art, the secondary circuit of one device is "wired" differently from the secondary circuit of the other device, and hence I do not consider such modification an essentially different construction from the first described cattle guard. For instance, if in the first described construction the wire H' be cut at X (see Fig. 6) and wire H⁴ (indicated by dotted lines), be extended from coil $h$ to ground plate H⁵ (indicated by dotted lines), upon an animal closing the primary circuit, as hereinbefore described, such animal being in contact, by either or both feet, with plates D D, of frame E², such animal will form part of the secondary circuit; and if the wires indicated by the dotted lines lettered G² in Fig. 6 are electrically connected with wire H and plates D' D', the animal closing the primary circuit, as described, and by contact with either plates D and D', or both, will form an element in the secondary circuit and receive an electric shock.

Having thus described my invention, what I claim, and desire to secure by Letters Patent, is—

1. An electric cattle guard consisting of a yieldingly mounted frame having a conducting surface not in electric contact with the ground and with which an animal attempting to cross the guard will come in contact, a primary electric circuit, an induction coil and an automatic circuit closer forming elements in such primary circuit, a connection extending from the automatic circuit closer to the yieldingly mounted frame so that an animal attempting to cross the cattle guard and depressing such yieldingly mounted frame will actuate such automatic circuit closer and close the primary circuit of which it forms an element, and a secondary electric circuit, of which the animal depressing the yieldingly mounted frame forms an element, extending from the induction coil of the primary circuit to the conducting surface of the yieldingly mounted frame and back to and through the induction coil; substantially as described.

2. An electric cattle guard consisting of more than one yieldingly mounted frames, each having a conducting surface not in electric contact with the ground and with which an animal attempting to cross such frame will come in electrical contact, an electric circuit, more than one automatic circuit closer interposed in such circuit and connected, with the yieldingly mounted frames, so that an animal attempting to cross the guard and depressing any one of such yieldingly mounted frames will actuate such automatic circuit closer and close the circuit of which it forms an element, an induction coil and an electric generator in the circuit, and a second electric circuit, of which the animal depressing the yieldingly mounted frame forms an element, extending from the induction coil of the first named circuit to the electric conducting surface of the yieldingly mounted frame and back to and through the induction coil; substantially as described.

3. An electric cattle guard consisting of a series of convex metal plates, series of vertically extending metal plates to which, respectively, the metal plates of the first named series are, secured, a series of bars extending underneath the series of metal plates and into which, the respective vertical plates extend, a packing of non-conducting material securing the said plates in the said bars, bars securing the non-conducting bars together and forming in connection therewith a frame, springs on which such frame is yieldingly mounted, and conductors electrically connected with the convex metallic plates and extending, to an electric circuit whereby such convex plates are made elements of such electric circuit; substantially as described.

DAVID H WILSON.

Witnesses:
JAMES L. CLARK,
FLORA L. BROWN.